(12) United States Patent
Smith, III

(10) Patent No.: US 8,662,503 B2
(45) Date of Patent: Mar. 4, 2014

(54) METHOD AND APPARATUS FOR PISTON-ACTUATED ELASTOMER PROBE SEAL IN A HYDRAULIC COUPLING MEMBER

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 254 days.

(21) Appl. No.: 13/327,933

(22) Filed: Dec. 16, 2011

(65) Prior Publication Data

US 2012/0086175 A1    Apr. 12, 2012

Related U.S. Application Data

(62) Division of application No. 12/189,452, filed on Aug. 11, 2008, now Pat. No. 8,313,105.

(60) Provisional application No. 61/073,576, filed on Jun. 18, 2008.

(51) Int. Cl.
*F16J 15/26*    (2006.01)

(52) U.S. Cl.
USPC .......................................... 277/579; 277/585

(58) Field of Classification Search
USPC .......... 277/526, 531, 579, 585, 586; 285/108; 251/149.7; 137/614.04
See application file for complete search history.

(56) References Cited

U.S. PATENT DOCUMENTS

| | | | |
|---|---|---|---|
| 3,147,992 A | 9/1964 | Haeber et al. | |
| 5,052,439 A | 10/1991 | Smith, III | |
| 5,203,374 A | 4/1993 | Smith, III | |
| 5,232,021 A | 8/1993 | Smith | |
| 5,556,139 A | 9/1996 | Wilkins | |
| 5,771,927 A | 6/1998 | Johansen et al. | |
| 5,975,589 A | 11/1999 | Wilkins | |
| 5,983,934 A | 11/1999 | Smith, III | |
| 6,007,106 A | 12/1999 | Wilkins | |
| 6,179,002 B1 | 1/2001 | Smith, III | |
| 6,202,691 B1 | 3/2001 | Smith, III | |
| 6,575,430 B1 | 6/2003 | Smith, III | |
| 6,923,476 B2 | 8/2005 | Smith, III | |
| 7,063,328 B2 | 6/2006 | Smith, III | |
| 7,163,190 B2 | 1/2007 | Smith, III | |
| 7,303,194 B2 | 12/2007 | Smith, III | |
| 7,578,312 B2 | 8/2009 | Smith, III | |
| 7,762,525 B2 * | 7/2010 | Smith, III | 251/149.7 |
| 2004/0084848 A1 * | 5/2004 | Smith, III | 277/336 |
| 2005/0029749 A1 * | 2/2005 | Smith, III | 277/602 |
| 2005/0057040 A1 * | 3/2005 | Smith, III | 285/108 |
| 2008/0224466 A1 * | 9/2008 | Smith | 285/106 |

FOREIGN PATENT DOCUMENTS

| | | |
|---|---|---|
| GB | 2406151 A | 3/2005 |
| GB | 2447530 A | 9/2008 |

* cited by examiner

*Primary Examiner* — Vishal Patel

(74) *Attorney, Agent, or Firm* — Wong, Cabello, Lutsch, Rutherford & Brucculeri, LLP.

(57) ABSTRACT

A female hydraulic coupling member has an elastomer probe seal molded to or abutting a ring-shaped metal base which is adapted to exert a compressive force on the probe seal when exposed to hydraulic fluid pressure. The compressive force causes the seal to expand in a radial direction thereby increasing its sealing effectiveness. A retainer nut for holding the seal in the receiving chamber may have an angled surface which acts to urge the seal in an inward, radial direction when an axial, compressive force is applied to the seal.

12 Claims, 4 Drawing Sheets

METHOD AND APPARATUS FOR PISTON-ACTUATED ELASTOMER PROBE SEAL IN A HYDRAULIC COUPLING MEMBER

CROSS-REFERENCE TO RELATED APPLICATIONS

This application is a division of U.S. patent application Ser. No. 12/189,452 filed on Aug. 11, 2008, and which claims the benefit of U.S. Provisional Patent Application No. 61/073,576 filed Jun. 18, 2008.

STATEMENT REGARDING FEDERALLY SPONSORED RESEARCH OR DEVELOPMENT

Not Applicable

BACKGROUND OF THE INVENTION

1. Field of the Invention

This invention relates to hydraulic coupling members. More particularly, it relates to subsea female coupling members having elastomeric probe seals.

2. Description of the Related Art Including Information Disclosed Under 37 CFR 1.97 and 1.98

Hydraulic couplings typically comprise a female member having a receiving chamber and a male member having a generally cylindrical probe section which is sized and configured for insertion into the receiving chamber of a corresponding female member. Seal elements within the receiving chamber of the female member create a fluid-tight seal to the surface of the male probe.

In hydraulic couplings designed for subsea use in the offshore oil and gas industry, the female coupling members usually contain replaceable seals and may be retrieved for servicing. In contrast, the male coupling members are often mounted to equipment on or near the wellhead and remain undersea throughout their working life. If the probe surface of a male hydraulic coupling member becomes damaged (e.g., galled, scratched, gouged, etc.), it may not seal properly when inserted into a female member even if the seal elements of the female member are in perfect condition. This is particularly true for couplings having seals formed from less resilient materials such as metal and engineering plastics—e.g., polyetheretherketone (PEEK)—whose strength and rigidity are usually advantageous, but which cannot conform as well to irregularities on an opposing mating surface. Retrieving and repairing a damaged subsea male coupling member may be prohibitively expensive. Accordingly, what is needed is a female coupling member having sealing elements which can conform to surface irregularities on the probe of a corresponding male member.

BRIEF SUMMARY OF THE INVENTION

A female hydraulic coupling member has an elastomer probe seal molded to a ring-shaped metal base which is adapted to exert a compressive force on the probe seal when exposed to hydraulic fluid pressure. The compressive force causes the seal to expand in a radial direction thereby increasing its sealing effectiveness. In yet other embodiments, the elastomer probe seal is a separate element from the metal base and the two elements abut one another.

In certain embodiments, a retainer nut holding the probe seal in the receiving chamber of the female member has an angled shoulder abutting the elastomeric seal element which further acts to urge the seal against the surface of the male probe member when the seal is compressed.

The method of the present invention employs a ring-shaped piston in an annular cylinder to apply a compressive force to an elastomeric seal. The annular cylinder is the space between the internal wall of the central axial bore of the female coupling member and the external cylindrical surface of the probe of the male coupling member. Hydraulic pressure within the coupling acts on the piston in the annular cylinder. When compressed, the elastomeric seal tends to expand in a radial direction, thereby increasing its sealing effectiveness.

BRIEF DESCRIPTION OF THE SEVERAL VIEWS OF THE DRAWING(S)

DETAILED DESCRIPTION OF THE INVENTION

Figure 1:
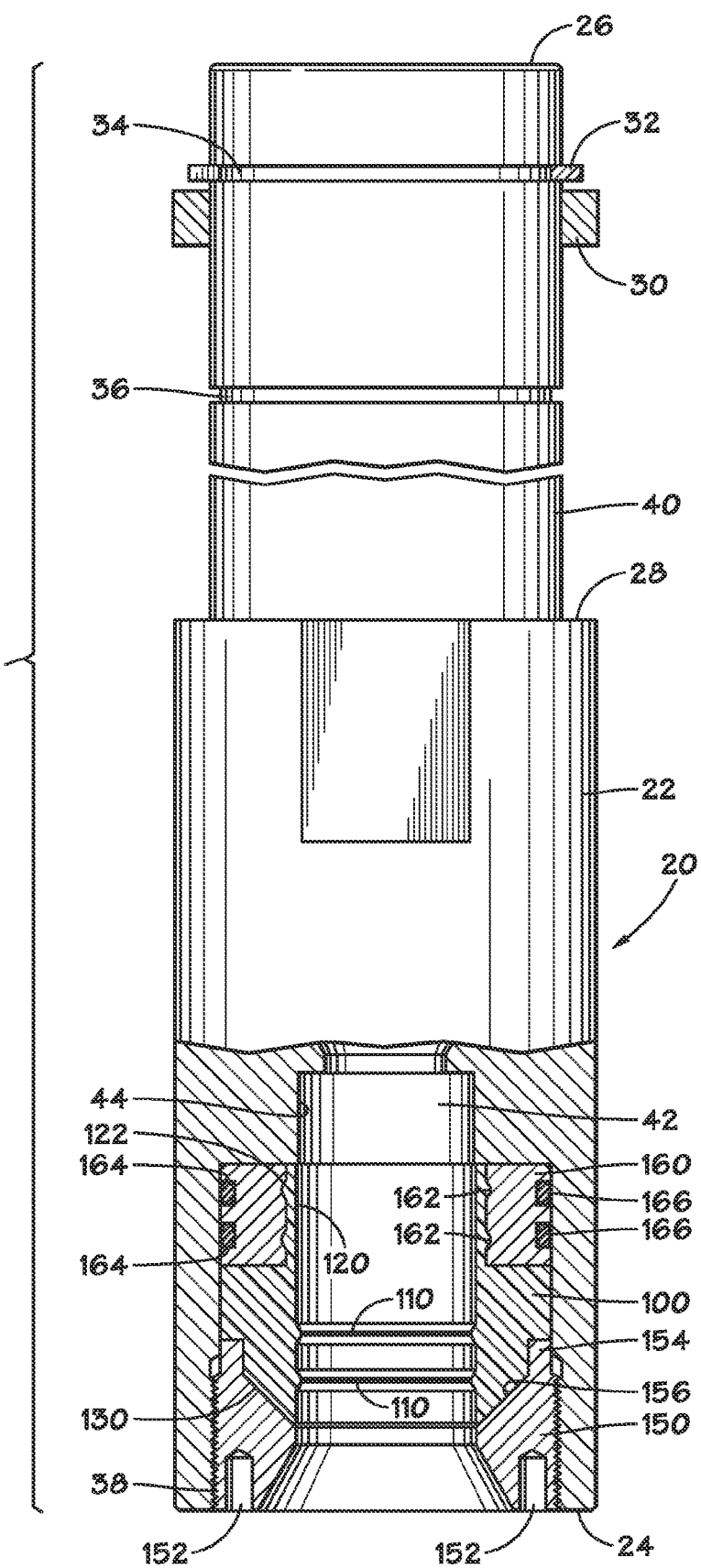
FIG. 1 is a partially cross-sectioned view of a female coupling member according to a first embodiment.

The invention may best be understood by reference to certain illustrative embodiments which are shown in the drawing figures.

Referring to FIG. 1, female coupling member 20 comprises generally cylindrical body 22 having first end 24 and opposing second end 26. Shoulder 28 is at one end of tail section 40. It allows the coupling to be installed in a manifold plate or similar holding device (not shown). A first surface of a manifold plate may bear against shoulder 28 and an opposing second surface of the manifold plate may bear against thrust washer 30 which may be secured to body 22 with retainer clip 32 in first groove 34. Second groove 36 may be provided in the external surface of tail section 40 to accommodate a manifold plate of lesser thickness. A fluid conduit may be attached to coupling 20 at second end 26 by means of a threaded connector, welding, compression fitting, swaging or other means well known in the art.

Coupling 20 has a central axial bore with various sections having different inside diameters. The section proximate first end 24 forms receiving chamber 42 having i.d. 44 at its innermost section and may comprise internally threaded section 38 for engaging a retainer nut which holds a seal assembly in receiving chamber 42. It should be appreciated that coupling body 22 is conventional and the present invention may be retrofitted to many existing female coupling members in the field without the need for machining or other complex operations.

The seal assembly of the present invention preferably employs an elastomer seal element. An elastomer is a polymer with the property of elasticity. The term, which is derived from "elastic polymer," is often used interchangeably with the term rubber. Each of the monomers which link to form the polymer is usually made of carbon, hydrogen, oxygen and/or silicon. Elastomers are amorphous polymers existing above their glass transition temperature, so that considerable segmental motion is possible. At ambient temperatures rubbers are thus relatively soft [Young's Modulus (E) ~3 MPa] and deformable. Elastomers are commonly used for seals, adhesives and molded flexible parts.

Elastomers are usually thermosets (requiring vulcanization) but may also be thermoplastic. The long polymer chains cross-link during curing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material. Without the cross-linkages or with short, uneasily reconfigured chains, the applied stress would result in a permanent deformation.

Temperature effects are also present in the demonstrated elasticity of a polymer. Elastomers that have cooled to a glassy or crystalline phase will have less mobile chains, and consequentially less elasticity, than those manipulated at temperatures higher than the glass transition temperature of the polymer.

It is also possible for a polymer to exhibit elasticity that is not due to covalent cross-links, but instead for thermodynamic reasons.

The particular elastomer used for the seal element of the present invention may be chosen both for its mechanical properties and for its chemical resistance properties. Coupling 20 may be used for hydraulic fluid in which case the elastomer may chosen for its compatibility with the particular hydraulic fluid in use. In other applications, coupling 20 may be used for a chemical injection line, in which case the elastomer may be chosen for its resistance to the particular chemical being injected.

Referring again to FIG. 1, elastomer seal 100 comprises one or more inwardly projecting radial sealing surfaces 110 which may be approximately triangular in cross section. In certain embodiments, the apex of the "triangle" may not be present but rather sealing projection 110 may have a generally flat surface at its innermost extent.

Tail section 120 of elastomer seal 110 lines the bore and provides increased surface area for seal 100 to bond to base ring 160. Tail section 120 may include one or more projections or ridges 122 on its outer surface. These ridges 122 may engage corresponding grooves 162 in base ring 160.

At the end opposite tail section 120, seal 100 may have angled surface 130. In this context, "angled" means the surface is at an acute angle to the longitudinal axis of seal 100.

Seal 100 may be molded to base ring 160 which may be formed of metal or other suitable material. Base 160 may have one or more grooves 162 on its inner circumference for engaging ribs 122 on seal 100. Base 160 may also have one or more grooves 164 on its outer circumference for holding O-ring seals 166. O-ring seals 166 provide a fluid-tight seal between base 160 and the central axial bore of body 22 of coupling 20.

The seal assembly comprised of metal base 160 molded to elastomer seal 100 may be held in receiving chamber 42 by externally-threaded retainer nut 150. Blind holes 152 may be provided in the outer end of retainer nut 150 for engaging a spanner or other such tool for inserting and removing retainer nut 150.

The end of retainer nut 150 which is opposite the end having spanner holes 152 may have tongue 154 for bearing against elastomer seal 100 in the axial direction. Adjacent tongue 154, retainer nut 150 may have angled shoulder 156 for bearing against the outer end of seal 100 in an oblique manner.

The method of operation of the seal assembly shown in FIG. 1 is as follows: The central bore of coupling body 22 contains fluid under pressure. The probe of a corresponding male coupling member is inserted into the receiving chamber 42. Sealing projections 110 contact the outer, generally cylindrical surface of the male probe to create a fluid-tight seal. Fluid within coupling 20 will typically be at a pressure above ambient pressure. Therefore, the fluid will act on base 160 as though it were a piston in a cylinder urging it towards first end 24. This movement is resisted by elastomer seal 100 which is compressed between base 160 and the end of tongue 154 on retainer nut 150. As it is compressed, seal 100 tends to expand radially. Its expansion in the outward radial direction is prevented by body 22 and therefore results in inward radial expansion against the male probe increasing the sealing effectiveness of seal 100. The application of force by base 160 moving in response to fluid pressure also results in angled surface 130 sliding against angled shoulder 156 of retainer nut 150. This also acts to urge seal 100 in an inward radial direction thereby increasing its sealing effectiveness. Inasmuch as elastomers tend to flow under pressure, increasing the radial pressure on seal 100 causes it to conform to surface irregularities on the male probe. This improves the seal between the male and female members especially when the male probe has been galled, scratched, gouged or similarly damaged.

Figure 2:
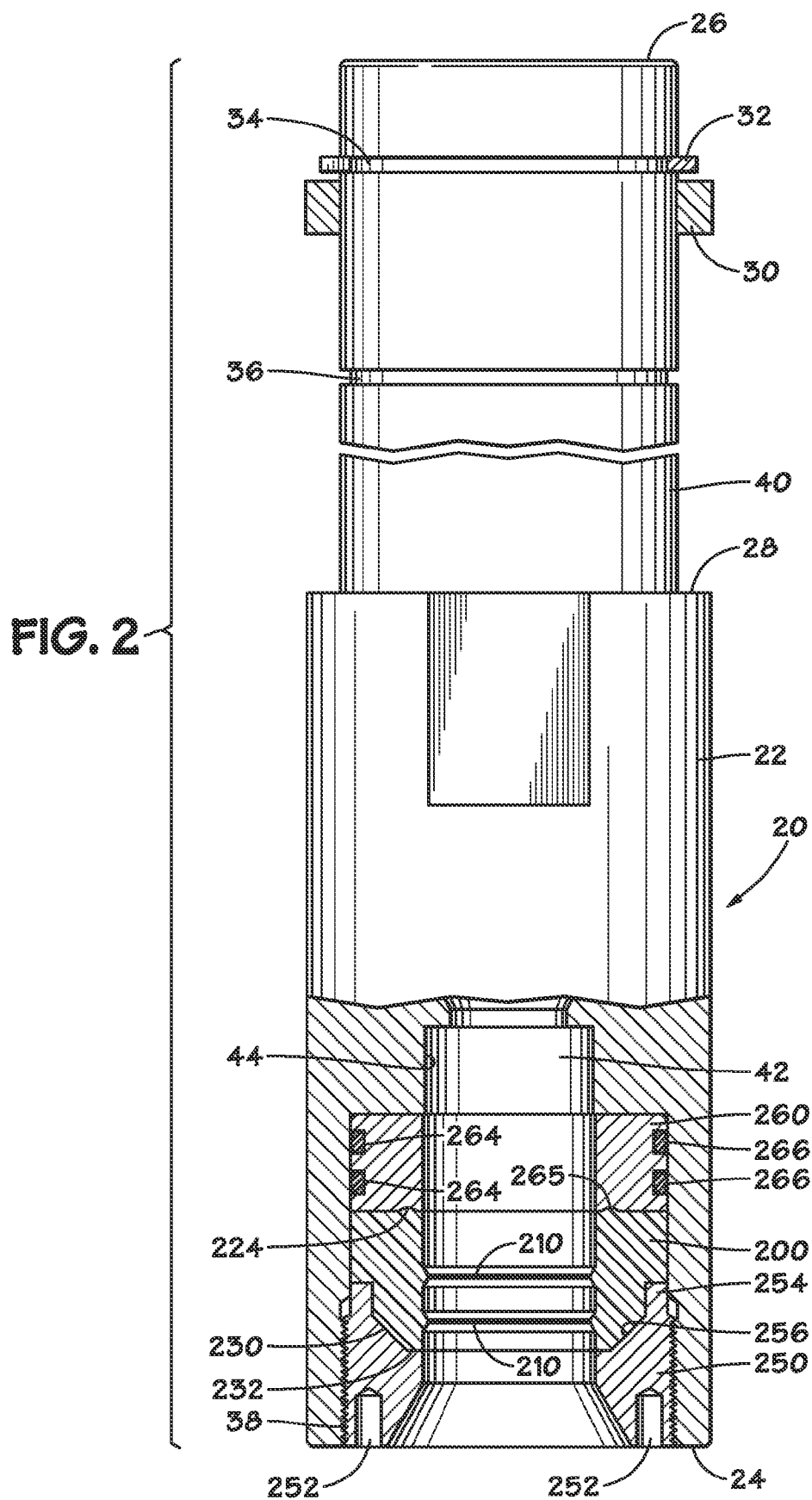
FIG. 2 is a partially cross-sectioned view of a female coupling member according to a second embodiment.

A second embodiment of the invention is illustrated in FIG. 2. In this embodiment, base 260 is not molded to seal 200 but rather is a separate piece.

Elastomer seal 200 comprises one or more inwardly projecting radial sealing surfaces 210 which may be approximately triangular in cross section. In certain embodiments, the apex of the "triangle" may not be present but rather sealing projection 210 may have a generally flat surface at its innermost extent.

At its inner end, seal 200 may have axial ridge 224 which may engage a corresponding groove on base 260.

At the end opposite ridge 224, seal 200 may have angled surface 230. In this context, "angled" means the surface is at an acute angle to the longitudinal axis of seal 200. Angled surface 230 may terminate at orthogonal section 232.

Seal 200 may abut base ring 260 which may be formed of metal or other suitable material. Base 260 may have one or more grooves 265 on its outer end for engaging ridge 224 on seal 200. Base 260 may also have one or more grooves 264 on its outer circumference for holding O-ring seals 266. O-ring seals 266 provide a fluid-tight seal between base 260 and body 22 of coupling 20.

The seal assembly comprised of metal base 260 and elastomer seal 200 may be held in receiving chamber 42 by externally-threaded retainer nut 250. Blind holes 252 may be provided in the outer end of retainer nut 250 for engaging a spanner or other such tool for inserting and removing retainer nut 250.

The end of retainer nut 250 which is opposite the end having spanner holes 252 may have tongue 254 for bearing against elastomer seal 200 in the axial direction. Adjacent tongue 254, retainer nut 250 may have angled shoulder 256 for bearing against angled surface 230 of seal 200 in an oblique manner.

The method of operation of the seal assembly shown in FIG. 2 is as follows: The central bore of coupling body 22 contains fluid under pressure. The probe of a corresponding male coupling member is inserted into the receiving chamber 42. Sealing projections 210 contact the outer, generally cylindrical surface of the male probe to create a fluid-tight seal. Fluid within coupling 20 will typically be at a pressure above ambient pressure. Therefore, the fluid will act on base 260 as though it were a piston in a cylinder urging it towards first end 24. This movement is resisted by elastomer seal 200 which is compressed between base 260 and the end of tongue 254 on retainer nut 250 and section 232 of seal 200 bears against a corresponding flat surface on retainer nut 250. As it is compressed, seal 200 tends to expand radially. Its expansion in the outward radial direction is prevented by body 22 and therefore results in inward radial expansion against the male probe increasing the sealing effectiveness of seal 200. The application of force by base 260 moving in response to fluid pressure also results in angled surface 230 sliding against angled shoulder 256 of retainer nut 250. This also acts to urge seal 200 in an inward radial direction thereby increasing its sealing effectiveness. Inasmuch as elastomers tend to flow under pressure, increasing the radial pressure on seal 200 causes it to conform to surface irregularities on the male probe. This improves the seal between the male and female members especially when the male probe has been galled, scratched, gouged or similarly damaged.

Figure 3:
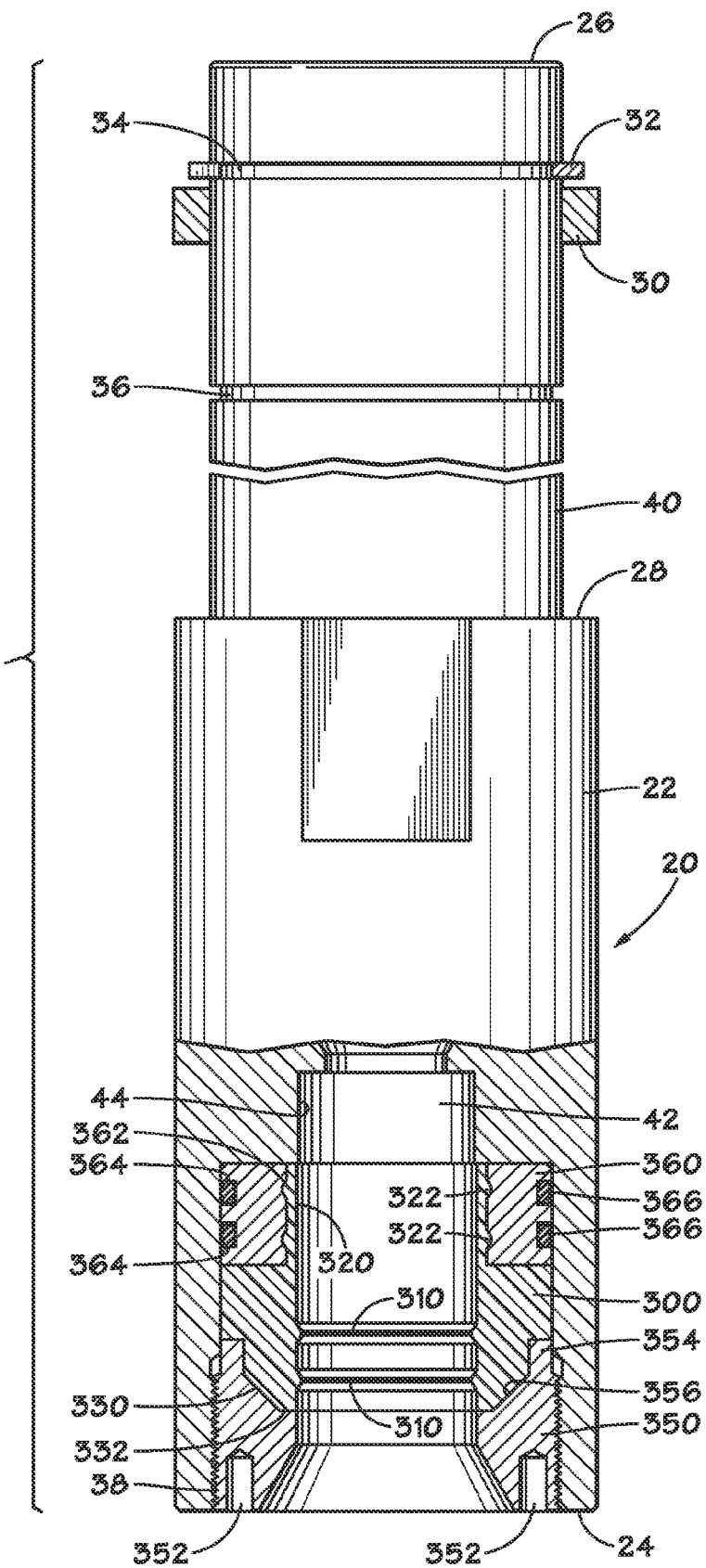
FIG. 3 is a partially cross-sectioned view of a female coupling member according to a third embodiment.

A third embodiment of the invention is shown in FIG. 3. Elastomer seal 300 comprises one or more inwardly projecting radial sealing surfaces 310 which may be approximately triangular in cross section. In certain embodiments, the apex of the "triangle" may not be present but rather sealing projection 310 may have a generally flat surface at its innermost extent.

Tail section 320 of elastomer seal 310 lines the bore and provides increased surface area for seal 300 to bond to base ring 360. Tail section 320 may include one or more projections or ridges 322 on its outer surface. These ridges 322 may engage corresponding grooves 362 in base ring 360.

At the end opposite tail section 320, seal 300 may have angled surface 330. In this context, "angled" means the surface is at an acute angle to the longitudinal axis of seal 300. Angled surface 330 may terminate at orthogonal section 332.

Seal 300 may be molded to base ring 360 which may be formed of metal or other suitable material. Base 360 may have one or more grooves 362 on its inner circumference for engaging ribs 322 on seal 300. Base 360 may also have one or more grooves 364 on its outer circumference for holding O-ring seals 366. O-ring seals 366 provide a fluid-tight seal between base 360 and body 22 of coupling 20.

The seal assembly comprised of metal base 360 molded to elastomer seal 300 may be held in receiving chamber 42 by externally-threaded retainer nut 350. Blind holes 352 may be provided in the outer end of retainer nut 350 for engaging a spanner or other such tool for inserting and removing retainer nut 350.

The end of retainer nut 350 which is opposite the end having spanner holes 352 may have tongue 354 for bearing against elastomer seal 300 in the axial direction. Adjacent tongue 354, retainer nut 350 may have angled shoulder 356 for bearing against the outer end of seal 300 in an oblique manner.

The method of operation of the seal assembly shown in FIG. 3 is as follows: The central bore of coupling body 22 contains fluid under pressure. The probe of a corresponding male coupling member is inserted into the receiving chamber 42. Sealing projections 310 contact the outer, generally cylindrical surface of the male probe to create a fluid-tight seal. Fluid within coupling 20 will typically be at a pressure above ambient pressure. Therefore, the fluid will act on base 360 as though it were a piston in a cylinder urging it towards first end 24. This movement is resisted by elastomer seal 300 which is compressed between base 360 and the end of tongue 354 on retainer nut 350 and section 332 of seal 300 bears against a corresponding flat surface on retainer nut 350. As it is compressed, seal 300 tends to expand radially. Its expansion in the outward radial direction is prevented by body 22 and therefore results in inward radial expansion against the male probe increasing the sealing effectiveness of seal 300. The application of force by base 360 moving in response to fluid pressure also results in angled surface 330 sliding against angled shoulder 356 of retainer nut 350. This also acts to urge seal 300 in an inward radial direction thereby increasing its sealing effectiveness. Inasmuch as elastomers tend to flow under pressure, increasing the radial pressure on seal 300 causes it to conform to surface irregularities on the male probe. This improves the seal between the male and female members especially when the male probe has been galled, scratched, gouged or similarly damaged.

Figure 4:
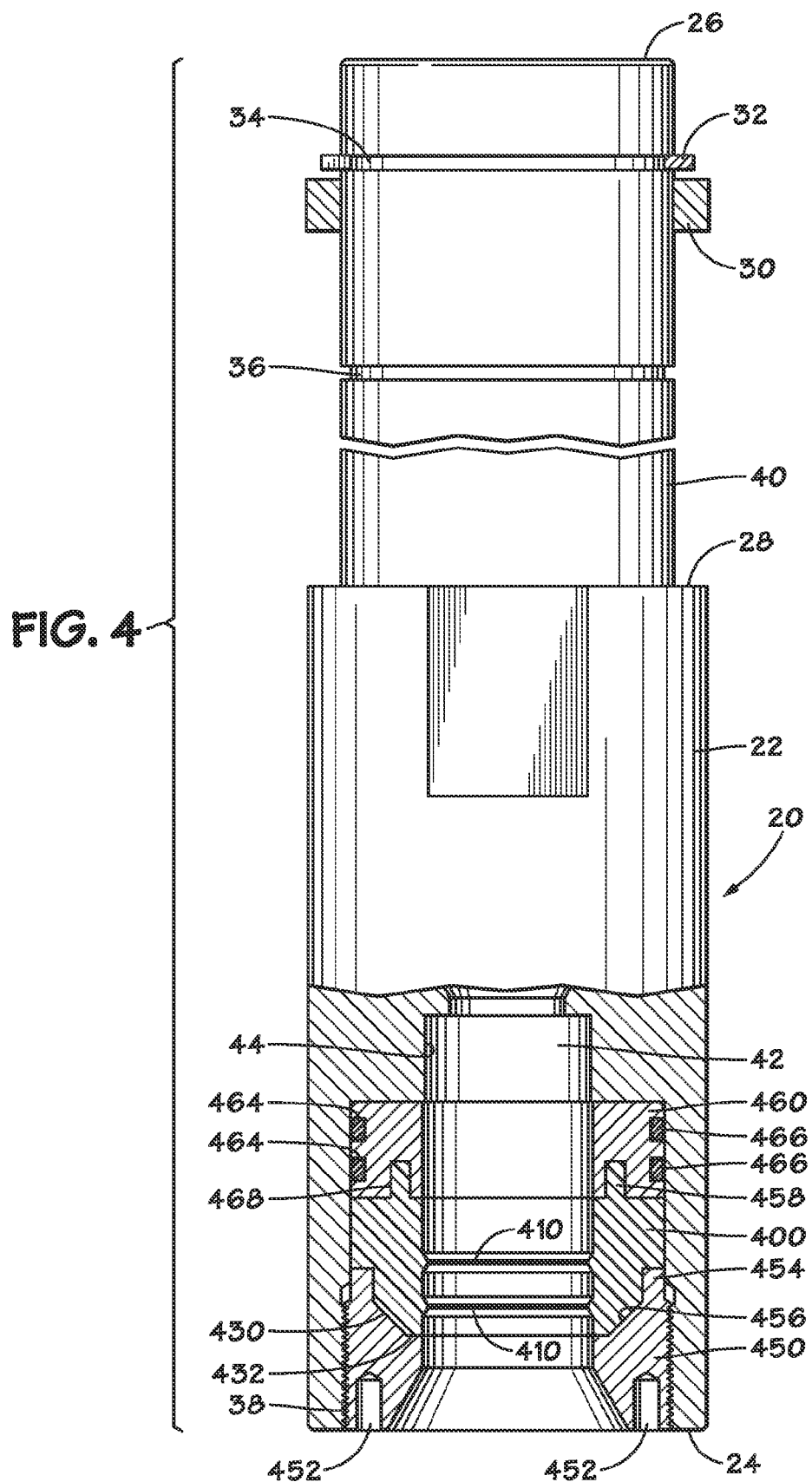
FIG. 4 is a partially cross-sectioned view of a female coupling member according to a fourth embodiment.

FIG. 4 shows a fourth embodiment of the invention. In this embodiment, base 460 is mechanically locked to elastomer seal 400.

Elastomer seal 400 comprises one or more inwardly projecting radial sealing surfaces 410 which may be approximately triangular in cross section. In certain embodiments, the apex of the "triangle" may not be present but rather sealing projection 410 may have a generally flat surface at its innermost extent.

At its inner end, seal 400 may have axial ridge 458 which may engage a corresponding groove on base 460 to resist implosion of seal 400 upon withdrawal of a male probe from receiving chamber 42 (which may create a negative pressure situation). In other embodiments, the axial ridge may be formed on one end of the base and the corresponding groove may be formed in the inner end of the seal.

At the end opposite ridge 424, seal 400 may have angled shoulder 430. In this context, "angled" means the surface is at an acute angle to the longitudinal axis of seal 400. Angled surface 430 may terminate at orthogonal section 432.

Seal 400 may abut base ring 460 which may be formed of metal or other suitable material. Base 460 may have one or more axial grooves 468 on its outer end for engaging ridge 458 on seal 400. Base 460 may also have one or more grooves 464 on its outer circumference for holding O-ring seals 466. O-ring seals 466 provide a fluid-tight seal between base 460 and body 22 of coupling 40. In yet other embodiments, the axial ridge may be on base 460 and seal 400 may have a corresponding groove in its interior end surface sized and spaced for receiving the axial ridge of the base when the seal assembly is installed in the body of a female coupling member.

The seal assembly comprised of metal base 460 and elastomer seal 400 may be held in receiving chamber 22 by externally-threaded retainer nut 450. Blind holes 452 may be provided in the outer end of retainer nut 450 for engaging a spanner or other such tool for use in inserting and removing retainer nut 450.

The end of retainer nut 450 which is opposite the end having spanner holes 452 may have tongue 454 for bearing against elastomer seal 400 in the axial direction. Adjacent tongue 454, retainer nut 450 may have angled shoulder 456 for bearing against angled shoulder 430 of seal 400 in an oblique manner.

The method of operation of the seal assembly shown in FIG. 4 is as follows: The central bore of coupling body 22 contains fluid under pressure. The probe of a corresponding male coupling member is inserted into the receiving chamber 42. Sealing projections 410 contact the outer, generally cylindrical surface of the male probe to create a fluid-tight seal. Fluid within coupling 20 will typically be at a pressure above ambient pressure. Therefore, the fluid will act on base 460 as a piston in a cylinder, urging it towards first end 24. This movement is resisted by elastomer seal 400 which is compressed between base 460 and the end of tongue 454 on retainer nut 450 and section 432 of seal 400 bears against a corresponding flat surface on retainer nut 450. As it is compressed, seal 400 tends to expand radially. Its expansion in the outward radial direction is prevented by body 22 and therefore results in inward radial expansion against the male probe increasing the sealing effectiveness of seal 400. The application of force by base 460 moving in response to fluid pressure also results in angled surface 430 sliding against angled shoulder 456 of retainer nut 450. This also acts to urge seal 400 in an inward radial direction thereby increasing its sealing effectiveness. Inasmuch as elastomers tend to flow under pressure, increasing the radial pressure on seal 400 causes it to conform to surface irregularities on the male probe. This improves the seal between the male and female members especially when the male probe has been galled, scratched, gouged or similarly damaged.

Although the invention has been described in detail with reference to certain preferred embodiments, variations and modifications exist within the scope and spirit of the invention as described and defined in the following claims.

What is claimed is:

1. A probe seal assembly for a female hydraulic coupling member comprising:
    a generally ring-shaped seal comprising a first, less rigid portion molded to a second, more rigid portion, the first portion being joined at a first end to at least one end and the inner surface of the second portion and having a surface disposed at an acute angle to the longitudinal axis of the seal at an opposing second end and a stepped outer diameter forming a shoulder in the outer circumferential surface of the first, less rigid portion; and,
    a generally ring-shaped retainer having means for engaging the body of a female hydraulic coupling member, a first, exterior end and an opposing, second, interior end comprising a shoulder disposed at an acute angle to the longitudinal axis of the retainer which shoulder abuts the angled surface at the second end of the seal when the seal assembly is installed in a female hydraulic coupling member and an annular projection having a generally rectangular cross section adjacent the angled surface said annular projection sized and spaced to engage the shoulder on the outer circumferential surface of the less rigid portion of the generally ring-shaped seal.

2. A probe seal assembly as recited in claim 1 further comprising:
    at least one circumferential groove on the inner surface of the second portion of the generally ring-shaped seal; and,
    at least one circumferential ridge on the first portion of the generally ring-shaped seal which is sized and spaced to fit within the circumferential groove on the second portion when the first and second portions are molded together.

3. A probe seal assembly as recited in claim 1 further comprising:
    a second shoulder on the second, interior end of the retainer adjacent the angled shoulder said second shoulder being generally orthogonal to the longitudinal axis of the retainer; and,
    a second surface at the second end of the generally ring-shaped seal adjacent the angled surface, said second surface sized and spaced to bear against the second shoulder on the second end of the retainer when the seal assembly is installed in a female hydraulic coupling member.

4. A probe seal assembly as recited in claim 1 wherein the means for engaging the body of a female hydraulic coupling member comprises external threads on the retainer.

5. A probe seal assembly as recited in claim 4 further comprising at least one pair of blind holes in the first end of the retainer sized and spaced to engage a spanner.

6. A probe seal assembly as recited in claim 1 further comprising a circumferential groove on the outer surface of the second, more rigid portion of the generally ring-shaped seal.

7. A probe seal assembly as recited in claim 6 further comprising a seal in the circumferential groove.

8. A probe seal assembly as recited in claim 7 wherein the seal is an O-ring seal.

9. A probe seal assembly as recited in claim 1 wherein the second, more rigid portion of the generally ring-shaped seal is metal.

10. A probe seal assembly as recited in claim 1 further comprising at least one radial sealing projection on the inner surface of the generally ring-shaped seal.

11. A probe seal assembly as recited in claim 1 wherein the first less rigid portion of the generally ring-shaped seal comprises an elastomer.

12. A probe seal assembly as recited in claim 1 wherein the first less rigid portion of the generally ring-shaped seal consists of an elastomer.

* * * * *